March 15, 1955
E. DE L. DAVIES ET AL
2,704,255
METHOD AND APPARATUS FOR REMOVING
MUCILAGE FROM COFFEE BEANS
Filed Feb. 26, 1954
2 Sheets-Sheet 1
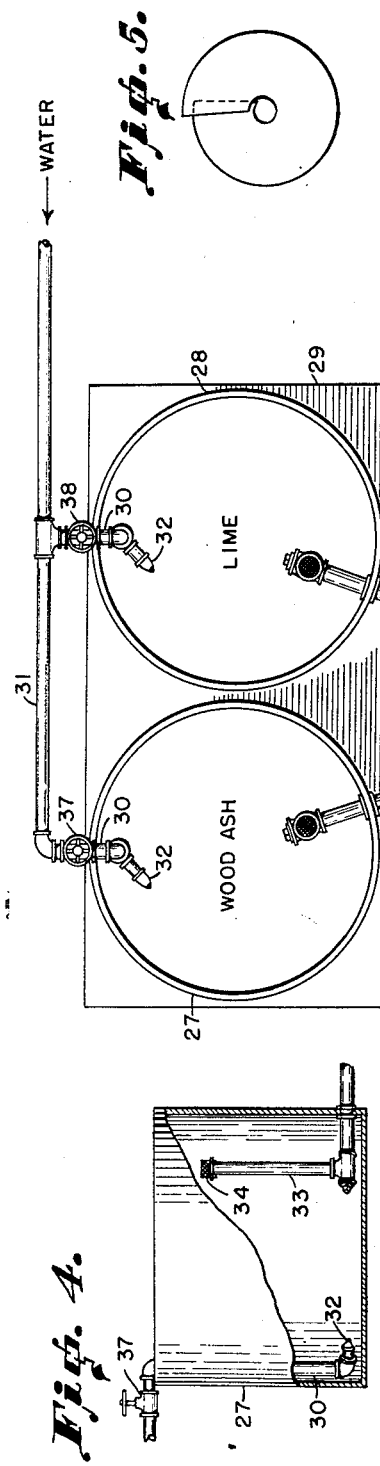
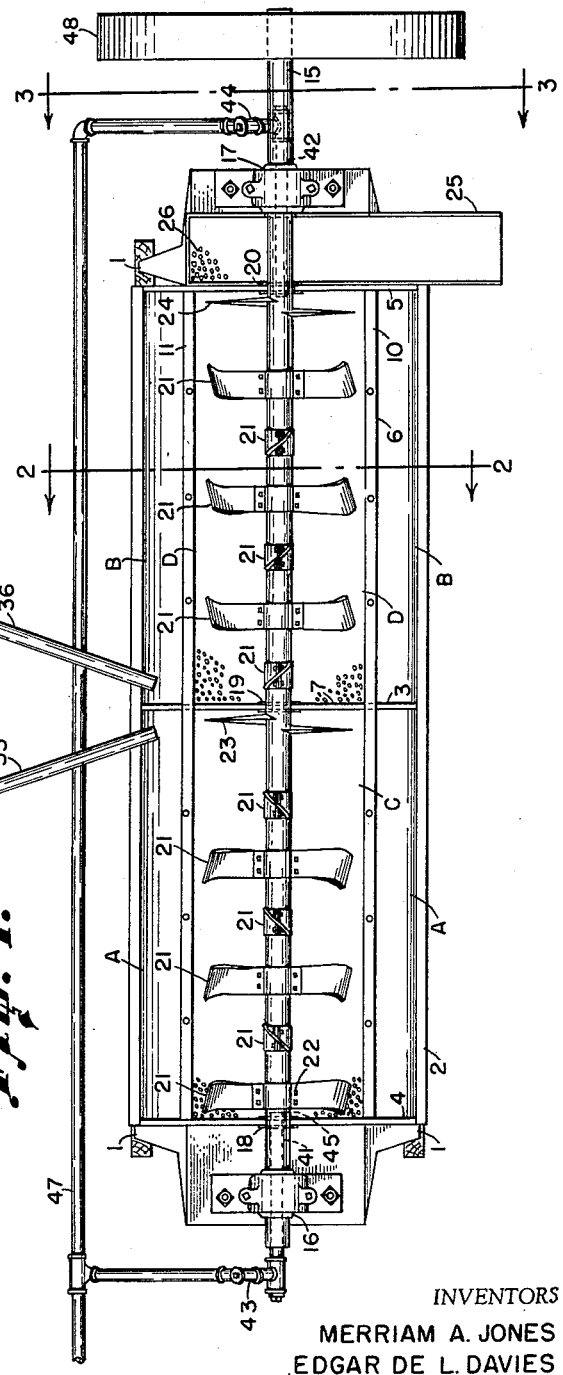
INVENTORS
MERRIAM A. JONES
EDGAR DE L. DAVIES
BY
ATTORNEYS

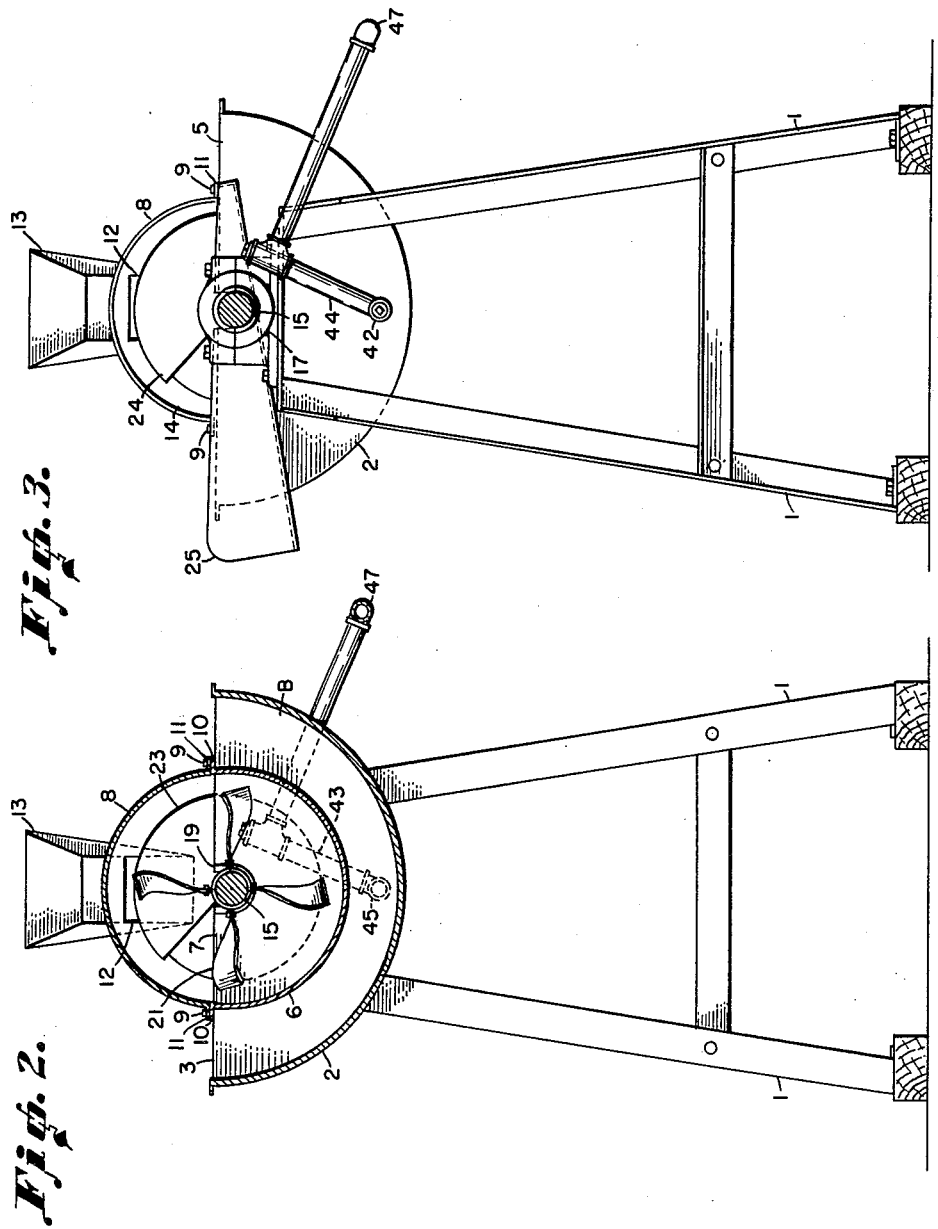

United States Patent Office

2,704,255
Patented Mar. 15, 1955

2,704,255

METHOD AND APPARATUS FOR REMOVING MUCILAGE FROM COFFEE BEANS

Edgar de L. Davies, San Sebastian, and Merriam A. Jones, Guatemala City, Guatemala, dedicated to the free use of the People in the territory of the United States Application February 26, 1954, Serial No. 412,968

9 Claims. (Cl. 99—65)

A non-exclusive, irrevocable, royalty-free license in the invention herein described, for all governmental purposes, throughout the world, with the power to grant sublicenses for such purposes, is hereby granted to the Government of the United States of America.

This invention relates to an improved method and apparatus for removing the mucilaginous layer from coffee beans.

In the conventional preparation of what is commercially known as washed coffee, ripe coffee cheeries are pulped in a machine which removes the outer skin of the cherry. The peeled beans, however, retain a layer of slippery, tenacious mucilage which, if not removed, prevents good drying of the coffee. Ordinarily, to remove this undesirable layer, the beans have to be stored in tanks for from twelve to ninety hours and permitted to ferment, during which time the slippery pectinaceous material becomes soft and readily removable from the bean by washing. This procedure may even take as long as two weeks.

The use of solutions of strong alkalis or of lime has heretofore been proposed; but these are either unsatisfactory or too dangerous for use by the extremely unskilled labor available on the coffee plantations. Furthermore, when lime is used alone, it coats the mucilage layer with a layer of insoluble calcium salt which can be removed only by very vigorous and thorough washing.

We have now discovered a method which, if carried out as a batch process, reduces the total time needed to remove the mucilaginous layer to about ten minutes and which, if carried out as a continuous process in the apparatus invented by us and described herein, is capable of treating 2,400 pounds of pulped beans per hour. This is equivalent to about 4000 pounds of coffee cherry.

One object of this invention is, therefore, to reduce the time required to remove the mucilaginous layer from the freshly pulped coffee bean.

Another object is to provide a method which may be carried out continuously.

A further object is to remove the mucilaginous layer without resorting to fermentation.

Another object is to provide a method which avoids the necessity of using dangerous chemicals.

Still another object is to provide an apparatus in which our process may be carried out continuously.

Other objects will become apparent from the disclosure below.

Our invention will be more readily understood from the description which follows and from the accompanying drawings.

In the drawings:

Figure 1 is a plan view of our apparatus with the cover removed to show the internal construction.

Figure 2 is a cross section of a side elevation taken on line 2—2 in Figure 1.

Figure 3 is a cross section of a side elevation taken on line 3—3 in Figure 1.

Figure 4 is a side view of one of the chemical supply tanks with the wall partially broken away to show the method of feeding the solution to the apparatus.

Figure 5 shows the details of the single turn screw conveyor which will be described in full below.

Our process comprises essentially a preliminary treatment of the wet pulped coffee with wood ash, which loosens the mucilage coating, followed by a treatment with lime, which completely removes the loosened coating.

To carry out this process continuously, we have devised the below-described apparatus which constitutes one phase of our invention:

The apparatus consists essentially of a stand 1 on which is mounted an elongated trough 2 of semi-circular cross section, which is preferably about 68 inches long and about two feet in diameter. A transverse partition 3 divides it into two equal compartments A and B which are closed at the ends by means of end plates 4 and 5, respectively. Mounted inside the trough, and coaxially with it, there is an elongated screen 6, also of semi-circular cross section, which is the same length as trough 2, but of smaller diameter, preferably about 14 inches. The screen may be of perforated metal or other material having holes small enough to prevent passage of the coffee beans. A semi-circular transverse partition 7 divides the screen into two equal compartments C and D which are also closed at their ends. End plates 4 and 5, respectively, may serve as walls for both the outer trough 2 and inner screen 6. The screen is further provided with a cover 8 which is semi-circular in cross section and is of the same diameter and length as the screen. Cover 8 is of solid metal and is removable in one piece from the screen. The cover may be secured to the screen by means of bolts 9 passed through flanges 10 and 11 of screen 6 and cover 8, respectively. Thus, when cover 8 is secured in place it forms with screen 6 an elongated tubular member, the lower half of which is perforated to form a screen and the upper half of which is solid. This tube is coaxial with the outer trough, and is of such diameter as to give enough clearance between the trough and screen to provide for easy cleaning. The ends of cover 8 are completely closed except for an inlet opening 12 into which a hopper 13 is secured, and an outlet 14 at the opposite end.

A shaft 15, mounted on bearings 16 and 17, runs the length of screen 6 and protrudes through end walls 4 and 5. Bearings 16 and 17 are preferably located outside the screen, and may advantageously be secured to the ends of stand 1. Water seals 18, 19, and 20 are provided around the shaft where it passes through the end plates and the center partition. The axis of the shaft is parallel to and is located slightly below the axis of the elongated semi-circular screen, preferably about one-half inch lower. On the portion of the shaft 15 inside the screen, there are mounted, at regular intervals of about six inches, a series of steel beaters 21.

The end of each beater is cupped slightly, concave in the direction of rotation of the shaft, and pitched alternately to propel the coffee with or against the direction of flow in the screen. The alternate beaters which propel the coffee forward, that is, in a direction from the inlet hopper 13 toward outlet 14, are pitched slightly more than those which push the coffee in the opposite direction, with the result that there is an over all forward movement of coffee through the apparatus. The beaters may be secured to the shaft by any suitable means, as by bolts 22; and are of such length as to preferably provide about three-eights inch clearance between their outer extremity and the bottom of the screen. About a half inch clearance should be provided between the intake end and the first beater and between the central partition and the first beater in the screen compartment. At the outlet end of each compartment, shaft 15 carries radially split steel discs 23 and 24 with a one-inch pitch which act as single turn screw conveyors. These serve to lift the coffee over central partition 7 and end wall 5 at the outlet end, and also regulate the overall rate of flow of coffee through the machine. At the outlet end of the latter there is mounted a steeply inclined chute 25 which receives coffee lifted over end wall 5 by means of screw 24. Any suitable receptacle, not shown, may serve to receive the material sliding down the chute. A series of holes 26 in the latter permit drainage of liquid from the treated coffee.

Shaft 15 is rotated by means of pulley 48 which is mounted at one end and which may be connected to any suitable source of power, not shown.

Above the main body of the machine two tanks 27 and 28 are mounted on platform 29. These tanks contain the chemicals for treating the coffee. Tank 27 contains wood ash extract, while tank 28 contains a suspension of lime. Each tank contains an inlet pipe 30 which is connected to a source of water 31. The pipes 30 extend to the bottoms of the tanks and are provided with nozzles 32 for ejecting a jet of water to stir the solutions. Liquid in the tanks is kept at a constant level by means of overflow pipes 33 fitted at their tops with coarse filters 34. Wood ash extract from tank 27 is conducted by means of pipe 35 to compartment A in trough 2, and lime from tank 28 is conducted by means of pipe 36 to compartment B of trough 2. Valves 37, 38, 39, and 40 control the flow of liquid in thehir respective pipes.

The solutions in the compartments of our apparatus are kept at a constant level by means of pipes 41 and 42, fitted with filters 45 and 46, and connected to the bottoms of compartments A and B, respectively, at the ends thereof opposite inlet pipes 35 and 36. Pipes 41 and 42 are each provided with upwardly extending legs 43 and 44, respectively, the height of which determines the level of solution in the compartments. By means of the foregoing arrangement, the flow of water through nozzles 32 regulates flow into trough 2, which in turn regulates the rate of removal of partially spent solution of chemicals and mucilaginous material stripped from the coffee. The liquid and suspended solids removed through pipes 41 and 42 may be passed to a common recovery line 47 and conducted to settling tanks, not shown, from which the supernatant solution may be decanted or otherwise removed, and the gelatinous material recovered by filtration or centrifugation. The latter material, which is pectinaceous in nature, has possible uses as a feed.

The operation of the above-described apparatus for the continuous removal of mucilage from pulped coffee beans is illustrated by the example which follows. The specific values stated are illustrative only and should not be construed as limitations on the process.

*Example 1*

Freshly pulped coffee from a storage bin or directly from the pulping machine is continuously fed at the rate of about 2400 pounds per hour into the hopper of our machine which operates at about 80 R. P. M. A rate of bean addition of 2,400 pounds per hour corresponds to about 4,000 pounds of fresh coffee cherry. An aqueous extract of wood ash is simultaneously fed from one of the chemical storage tanks to the first half of the trough at the continuous rate of approximately one-half gallon per minute. The ash extract is prepared by adding ash to the supply tank at the rate of one pound for each hundred pounds of coffee cherry to be processed. A lime suspension from the other tank is fed to the second half of the trough at the same rate of one-half gallon per minute, one-half pound of lime being added to the supply tank for each hundred pounds of coffee cherry. The coffee discharged from the machine is free of mucilage and is ready for washing and drying.

No effect due to chemical processing could be detected by professional cup-testers to whom coffee samples were sent along with conventional fermented coffee prepared from the same batch of cherries.

The partially spent alkaline solutions in which the mucilage is dissolved or suspended was permitted to drain continuously from the trough into a settling tank from which the supernatant liquid was removed and the gelatinous material recovered.

*Example 2*

This example illustrates the extremely short time required for our treatment when carried out as a batch process.

A cement mixer was loaded with pulped coffee, allowing sufficient space for water and the solutions to be added. The mixer was started and, when it was rotating at a speed of 30–50 R. P. M. a suspension of wood ash in water was added. Enough of the aqueous suspension—containing one pound of ash in two gallons of water for each 100 pounds of pulped coffee—to just permit good mixing without the beans adhering to each other was used. Mixing was continued for two minutes, and then a suspension of hydrated lime in water, ½ pound of lime and 2 gallons of water per 100 pounds of pulped coffee, was added. As mixing was continued, the mucilage began to precipitate. When periodic hand tests indicated that the slippery feeling was gone and the beans began to rattle, the rotating mixer was slowly filled with water. The mixer was then stopped, a sieve was fastened over the opening, and the mixer inverted and restarted to permit the wash water to drain. New water was added, and the mixer used as a washing machine.

After a total treating time of ten minutes, the mucilage had been completely removed and the coffee was ready for drying.

Here too, no effect due to chemical treatment could be detected by professional cup-testers.

Procedural and mechanical variations are possible which will be obvious to those skilled in the art without departing from the spirit of the invention.

We hereby dedicate the invention herein described to the free use of the People in the territory of the United States to take effect on the granting of a patent to us.

We claim:

1. A method for removing mucilaginous coating from coffee beans which comprises treating coffee beans having such coating first with an aqueous suspension of wood ash, then, without removing said wood ash from the treated coffee beans, adding an aqueous suspension of hydrated lime, soaking the coffee beans in the resultant mixture of wood ash and lime for a short time, and then washing the coffee beans with fresh water.

2. A method for removing mucilaginous coating from pulped coffee beans which comprises treating pulped coffee beans having such coating with an aqueous extract of wood ash and then with an aqueous suspension of hydrated lime.

3. A method for removing mucilaginous coating from pulped coffee beans which comprises contacting pulped coffee beans having such coating with an aqueous extract of wood ash, contacting the so-treated coffee beans with an aqueous suspension of hydrated lime, and washing the coffee beans after the mucilaginous coating has been removed.

4. A continuous process for removing mucilaginous coating from pulped coffee beans which comprises continuously passing pulped coffee beans having such coating into a first treating zone; continuously feeding an aqueous extract of wood ash to said first treating zone while agitating the coffee beans; continuously removing treated coffee from said first zone and passing said coffee to a second treating zone; continuously feeding an aqueous suspension of hydrated lime to said second treating zone while agitating the coffee beans; and continuously removing coffee beans without the mucilaginous coating from said second zone.

5. The process of claim 4 in which spent treating solutions are continuously removed from the treating zones and suspended mucilage recovered therefrom.

6. A continuous process for removing mucilaginous coating from pulped coffee beans which comprises continuously passing pulped coffee beans having such coating into a first treating zone; continuously feeding an aqueous extract of wood ash to said first treating zone while agitating the coffee beans; continuously removing treated coffee from said first zone and passing said coffee to a second treating zone; continuously feeding an aqueous suspension of hydrated lime to said second treating zone while agitating the coffee beans; continuously removing coffee beans without the mucilaginous coating from said second zone; and washing said coffee beans free of treating solutions.

7. The process of claim 6 in which spent treating solutions are continuously removed from the treating zones and suspended mucilage recovered therefrom.

8. Apparatus for removing mucilaginous coating from pulped coffee beans which comprises an elongated trough having closed ends; a transverse portion separating said trough into two compartments; an elongated screen having an inlet end and exit end, said screen being mounted inside said trough coaxial therewith and having a transverse partition separating said screen into two compartments, a plurality of rotatable agitating means mounted in each of the screen compartments, alternate agitating means being pitched to propel the material forward and alternate agitating means being pitched to propel the material backward, the forward pitch being greater than the backward pitch, whereby there is a net forward movement of the material being treated; means adjacent the screen partition and adjacent its exit end for lifting particulate material over the top of said partition and said end; means adjacent the other side of said exit end for removing particulate material; and means for supplying fresh treating solutions to and for removing spent treating solutions from each of said aforementioned compartments.

9. Apparatus for removing mucilaginous coating from pulped coffee beans which comprises a horizontal elongated trough having closed ends and a transverse partition separating said trough into two compartments; a horizontal elongated tube having an inlet end and an exit end, said tube being commensurate with and coaxial with said trough and being mounted inside said trough, said tube having its lower half completely inside the trough and its upper half completely above the trough, the lower half comprising a screen having a plurality of perforations, the upper half being imperforate and detachable from the lower half; means at the inlet end of said tube for feeding coffee to be treated into the tube, and means at the exit end for permitting discharge of treated coffee; a transverse partition in the lower half of the tube separating the screen portion into two compartments commensurate with the compartments in the trough; a rotatable shaft mounted in the screen portion and extending the length of said screen portion and trough and protruding through the ends thereof; a plurality of agitating means mounted on said shaft adapted when rotating to translocate coffee being treated in the screen, alternate agitating means being pitched to propel the material forward and alternate agitating means being pitched to propel the material backward, the forward pitch being greater than the backward pitch, whereby there is a net forward movement of the material being treated; means mounted on the shaft immediately preceding the screen partition and immediately preceding the exit end adapted to lift coffee being treated over the tops of said partition and exit end; means adapted to remove material deposited over the top of the exit end; and means for supplying fresh treating solutions to and for removing spent treating solutions from each of the aforementioned compartments.

References Cited in the file of this patent

UNITED STATES PATENTS

| | | |
|---|---|---|
| 112,738 | Randall | Mar. 14, 1871 |
| 1,737,071 | Birnie | Nov. 26, 1929 |
| 1,960,692 | Brown | May 29, 1934 |
| 2,261,560 | Pellas et al. | Nov. 4, 1941 |
| 2,628,461 | Heyman | Feb. 17, 1953 |

FOREIGN PATENTS

| | | |
|---|---|---|
| 128,065 | Australia | July 8, 1948 |

OTHER REFERENCES

"New Caustic Peeling Method," by L. Charles Mazzola, reprinted from "Food Industries," January 1943.